United States Patent [19]

Toukura

[11] Patent Number: 5,681,239
[45] Date of Patent: Oct. 28, 1997

[54] IGNITION TIMING CONTROLLER FOR INTERNAL COMBUSTION ENGINE

[75] Inventor: Nobusuke Toukura, Yokohama, Japan

[73] Assignee: Nissan Motor Co., Ltd., Yokohama, Japan

[21] Appl. No.: 500,330

[22] Filed: Jul. 10, 1995

[30] Foreign Application Priority Data

Jul. 15, 1994 [JP] Japan ..................... 6-163894

[51] Int. Cl.$^6$ ..................... F02P 5/00
[52] U.S. Cl. ............... 477/107; 477/110; 123/419
[58] Field of Search ................. 123/406, 417, 123/416, 418, 419, 422, 423; 477/107, 110

[56] References Cited

U.S. PATENT DOCUMENTS

| | | | |
|---|---|---|---|
| 4,022,170 | 5/1977 | Crall et al. | 123/422 X |
| 4,852,537 | 8/1989 | Nagano et al. | 123/422 X |
| 4,870,935 | 10/1989 | Araki | 123/422 |
| 4,924,832 | 5/1990 | Abe | 123/422 X |
| 5,070,841 | 12/1991 | Fujimoto et al. | 123/422 |
| 5,094,209 | 3/1992 | Kishida | 123/422 |

*Primary Examiner*—Charles A. Marmor
*Assistant Examiner*—Saúl J. Rodriguez
*Attorney, Agent, or Firm*—Foley & Lardner

[57] ABSTRACT

In an ignition timing controller used in conjunction with an internal combustion engine of a vehicle provided with a mechanism for igniting fuel, the running condition of the engine is detected and the optimum ignition timing is determined based on the running condition. It is determined also whether or not the vehicle is accelerating, and the variation rate of engine speed during acceleration is detected. When the variation rate is a positive value which is equal to or greater than a predetermined value, the ignition timing is retarded by a predetermined amount relative to the optimum ignition timing. When the variation rate is less than this predetermined value, the correction amount is set to zero so that the timing is not retarded. In this way, forward/backward oscillation of the vehicle based on rotational vibration of the crankshaft during acceleration from coasting, is suppressed.

8 Claims, 8 Drawing Sheets

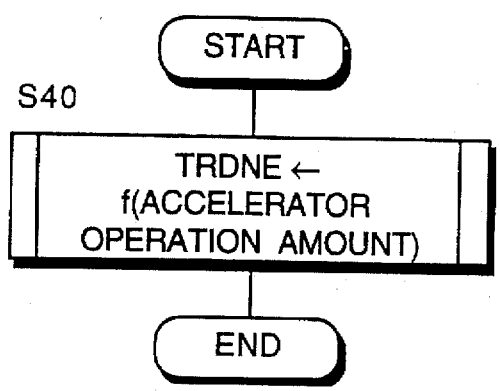
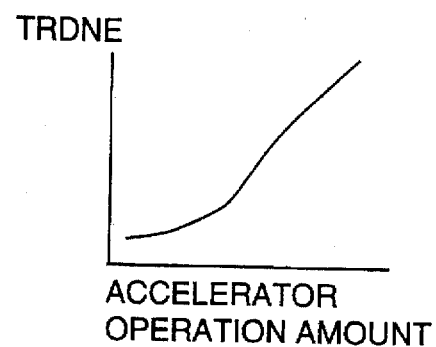
FIG. 10A  FIG. 10B
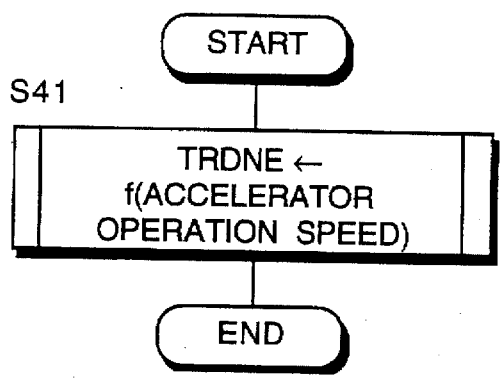
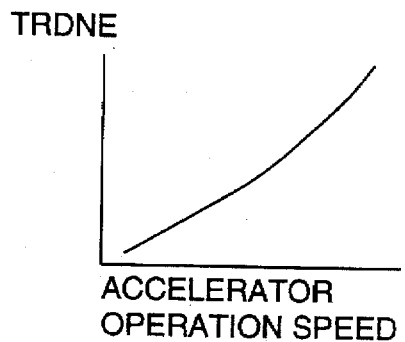
FIG. 11A  FIG. 11B
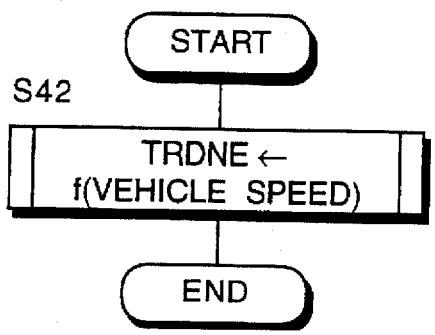
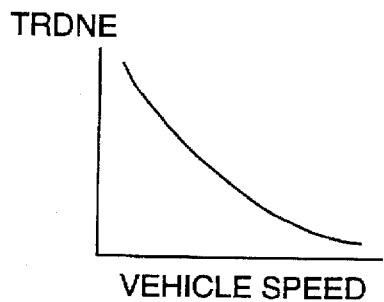
FIG. 12A  FIG. 12B

IGNITION TIMING CONTROLLER FOR INTERNAL COMBUSTION ENGINE

FIELD OF THE INVENTION

This invention relates to an engine ignition timing controller for suppressing oscillation in a forward/backward direction when a vehicle accelerates from coasting.

BACKGROUND OF THE INVENTION

The ignition timing of the engine when a vehicle accelerates from coasting is not the same as when it accelerates from another state.

In fuel injection engines, moreover, fuel injection begins suddenly when it accelerates from a state when injection has stopped as the vehicle is coasting.

When the vehicle accelerates from coasting, therefore, the output torque of the engine varies rapidly causing the crankshaft to vibrate, and this leads the vehicle to oscillate in a forward/backward direction.

A device to suppress this forward/backward oscillation is for example proposed in Tokkai Sho 59-201971 published in 1984 by the Japanese Patent Office, wherein vibration of the drive mechanism is suppressed by retarding or advancing the ignition timing in direct proportion to the variation of engine speed.

In this device, ignition timing control begins when the absolute value of the engine speed variation exceeds a predetermined value. If the variation of engine speed is positive, i.e. if the speed is increasing, the ignition timing is retarded, whereas if the variation of engine speed is negative, i.e. if the engine speed is decreasing, the ignition timing is advanced.

When the vehicle is coasting and then accelerates, the engine speed increases, but the variation is not constant and it alternately increases and decreases. When the accelerator pedal is sharply depressed, the fuel injection amount becomes excessive, and if a suitable output torque cannot be obtained, the engine speed variation may temporarily shift largely to the negative side.

In such a case, the aforesaid device advances the ignition timing. As a result, the engine combustion conditions sharply improve, the engine torque increases sharply, and the engine speed variation is largely shifted back in the positive direction. However, vibration-causing forces in a forward/backward direction are at a maxima when the engine speed varies in a positive direction, so the advance of ignition timing may have the opposite effect to the intended objective of suppressing forward/backward vibration.

SUMMARY OF THE INVENTION

It is therefore an object of this invention to more effectively suppress forward/backward vibration of the vehicle due to unevenness of engine speed when the vehicle accelerates from coasting.

It is a further object of this invention to prevent a rapid change in combustion conditions from occurring when the engine speed temporarily varies in the negative direction as the vehicle accelerates from coasting.

In order to achieve the above objects, this invention provides an ignition timing controller for use with an internal combustion engine of a vehicle. The engine is provided with a mechanism for igniting fuel. The controller comprises a mechanism for detecting a running condition of the engine, a mechanism for determining an optimum ignition period based on the running condition, a mechanism for detecting whether or not the vehicle is accelerating, a mechanism for detecting a rotation variation of the engine, a mechanism for retarding the ignition period by a predetermined correction amount when the variation rate is a positive value equal to or greater than a predetermined value while the vehicle is accelerating, and a mechanism for setting the correction amount to zero when the variation rate is less than the predetermined value.

It is preferable that the controller further comprises a mechanism for detecting a rotation speed of the engine, a mechanism for setting a retardation period based on the engine speed, and a mechanism for setting the correction amount to zero after the retardation period has elapsed.

Alternatively, in the vehicle comprising an accelerator for accelerating a speed of the engine according to an operation amount of the accelerator, the controller comprises a mechanism for detecting the operation amount, a mechanism for setting a retardation period based on the operation amount and a mechanism for setting the correction amount to zero after the retardation period has elapsed.

Alternatively, the controller comprises a mechanism for detecting an operation speed of the accelerator, a mechanism for setting the retardation period based on the operation speed and a mechanism for setting the correction amount to zero after the retardation period has elapsed.

Alternatively, the controller comprises a mechanism for detecting a travel speed of the vehicle, a mechanism for setting a retardation period based on the travel speed and a mechanism for setting the correction amount to zero after the retardation period has elapsed.

Alternatively, in the engine comprising a transmission mechanism with a multiplicity of gears of a different gear ratio that are selectively applied for driving the vehicle, the controller comprises a mechanism for detecting the gear ratio of the applied gear, a mechanism for setting a retardation period based on the gear ratio and a mechanism for setting the correction amount to zero after the retardation period has elapsed.

It is also preferable that the controller comprises a mechanism for detecting a rotation speed of the engine and a mechanism for increasing or decreasing the predetermined correction amount according to the rotation speed.

Alternatively, in a vehicle comprising an accelerator for accelerating a speed of the engine according to an operation amount of the accelerator, the controller comprises a mechanism for detecting the operation amount and a mechanism for increasing or decreasing the predetermined correction amount based on the operation amount.

Alternatively, the controller comprises a mechanism for detecting an operation speed of the accelerator and a mechanism for increasing or decreasing the predetermined correction amount based on the operation speed.

Alternatively, the controller comprises a mechanism for detecting a travel speed of the vehicle and a mechanism for increasing or decreasing the predetermined correction amount based on the travel speed.

Alternatively, in a engine comprising a transmission mechanism with a multiplicity of gears of a different gear ratio that are selectively applied for driving the vehicle, the controller comprises a mechanism for detecting the gear ratio of the applied gear and a mechanism for increasing or decreasing the predetermined correction amount based on the gear ratio.

It is also preferable that the acceleration determining mechanism comprises a mechanism for determining whether or not fuel is being supplied to the engine, and a mechanism for determining that the vehicle is accelerating when fuel is supplied after the state when fuel is not supplied.

Alternatively, in a vehicle comprising an accelerator for accelerating a speed of the engine according to an operation amount of the accelerator, the controller comprises a mechanism for detecting the operation amount and a mechanism for detecting an operation speed of the accelerator, and the acceleration determining mechanism determines that the vehicle is accelerating when the operation amount and the operation speed both are not less than predetermined values.

The details as well as other features and advantages of this invention are set forth in the remainder of the specification and are shown in the accompanying drawings.

BRIEF DESCRIPTION OF THE DRAWINGS

FIGS. 9A–13B are combinations of flowcharts and graphs showing a determining process of a predetermined value TRDNE according to this invention.

DESCRIPTION OF THE PREFERRED EMBODIMENTS

Figure 1:
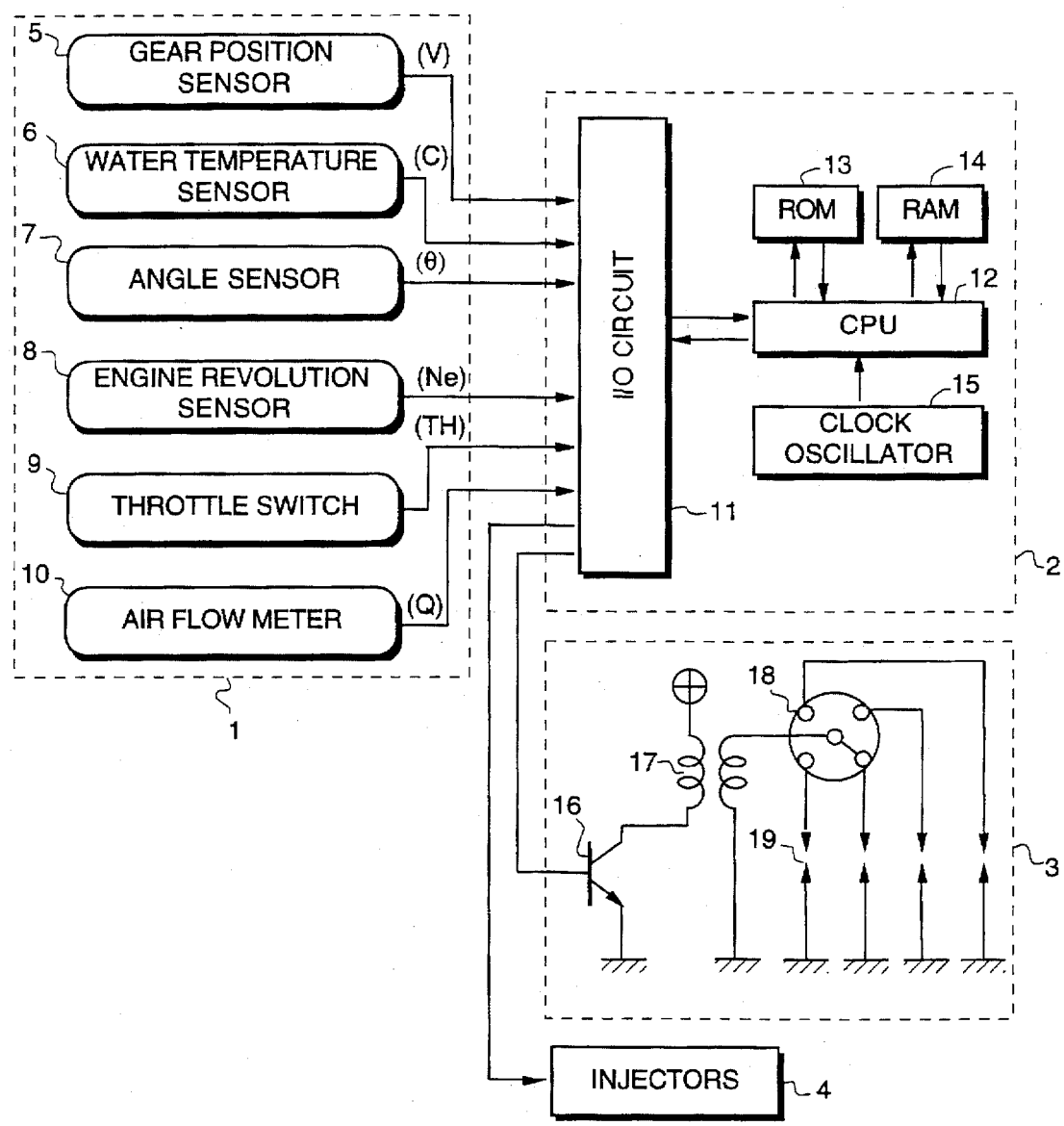
FIG. 1 is a schematic diagram of an ignition controller according to this invention.

Referring to FIG. 1 of the drawings, an ignition controller is provided with a various sensors 1, a microprocessor 2 that performs computations based on signals input from the sensors 1, an ignition mechanism 3 that operates according to an output signal from the microprocessor 2, and injectors 4, this controller being applied to a fuel injection type multi-cylinder engine.

The sensors 1 comprise a vehicle speed sensor 5 for detecting a vehicle speed V, a water temperature sensor 6 for detecting an engine water temperature C, a speed sensor 8 for detecting a predetermined engine rotation position, and outputting a reference position signal, this signal being also used for the calculation of engine speed, an angle sensor 7 for continuously detecting an engine rotation angle from the reference position and outputting an angle signal θ, a throttle switch 9 for detecting whether or not the engine intake throttle is an idle angle TH, and an air flow meter 10 for detecting an intake air volume Q corresponding to the engine load.

The microprocessor 2 comprises an I/O circuit 11 which receives an input signal from the sensors 1 and outputs a signal to the ignition mechanism 3 and injector 4, CPU 12, ROM 13 which stores an optimum ignition period TADVM as an angle from, e.g. top dead center, RAM 14, and clock oscillator 15 which outputs a clock pulse.

The optimum ignition period TADVM is preset according to an engine speed Ne and intake air volume Q. The optimum ignition period TADVM stored in the ROM 13 is read each time the reference position signal is input via the I/O circuit 11. The CPU 12 converts the optimum ignition period TADVM to an angle from the reference position, and outputs an ignition signal to the ignition mechanism 3 when the angle signal θ is equal to this converted value.

The ignition mechanism comprises an ignition coil 17 which emits a high voltage when a transistor 16 turns OFF according to the ignition signal, an electrical distributing unit 18, and spark plugs 19 disposed in each cylinder which emit a spark when high voltage current is supplied from the ignition coil 17 via the distributor 18.

Figure 2:
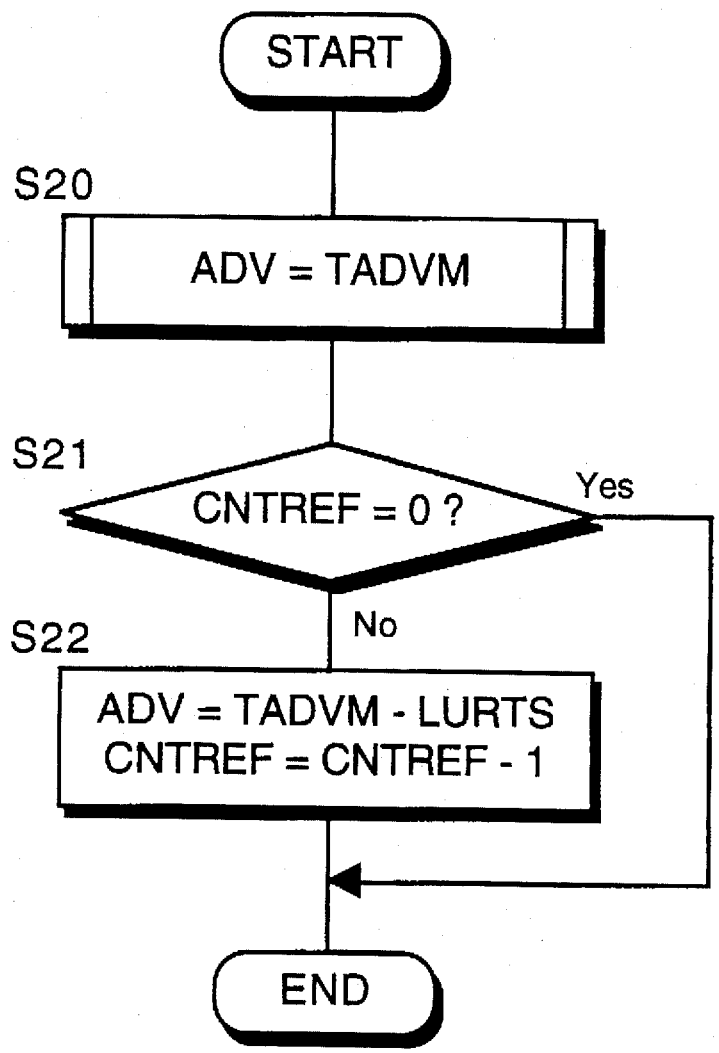
FIG. 2 is a flowchart of a main routine of an ignition control program according to this invention.

FIG. 2 shows the main routine of the ignition timing correction applied by the microprocessor 2. In a step S20, an optimum ignition map drawn up from the engine speed Ne and intake volume Q, is looked up, and the optimum ignition period TADVM is determined.

In a step S21, it is determined whether or not a retardation angle correction should be applied. This determination is performed based on a retardation angle counter value CNTREF showing whether or not the engine is in a retardation correction period of the ignition timing. The retardation angle counter value CNTREF is a timer value obtained by subtracting a value a predetermined value RETTIM. When CNTREF is 0, the routine is terminated without performing a retardation angle correction. When the CNTREF is not 0, the ignition timing is corrected using an ignition timing correction amount LURTS in a step S22. At the same time, "1" is subtracted from the retardation angle counter value CNTREF.

Figure 3:
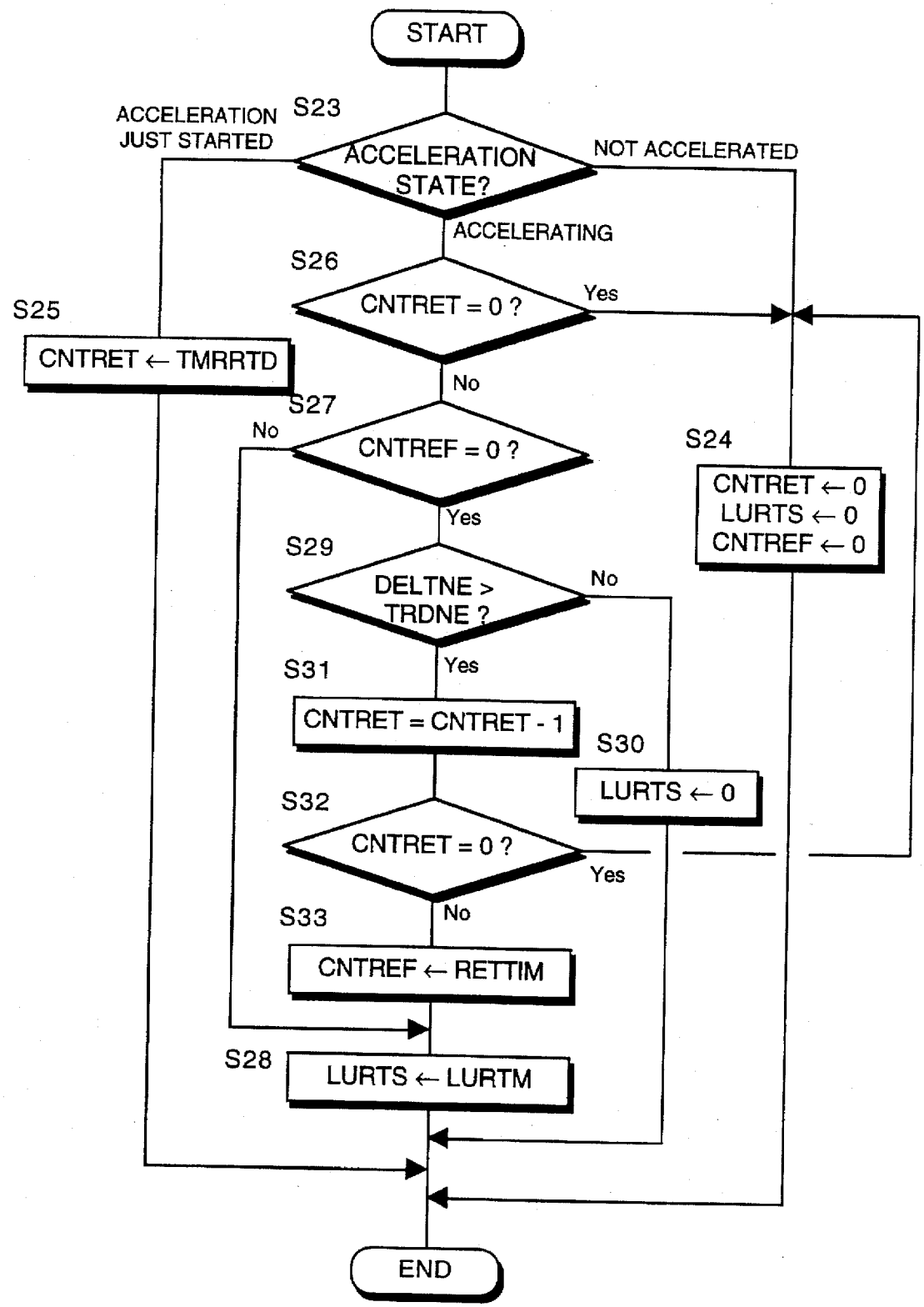
FIG. 3 is a flowchart showing a process of setting a control negative value CNTRET, retardation angle correction LURTS and retardation angle count value CNTREF according to this invention.

The predetermined value RETTIM, as an initial value of the retardation angle counter value CNTREF, is given by the routine shown in FIG. 3. This routine is executed, e.g. every 10 msec. First, in a step S23, the vehicle acceleration state is detected from the vehicle speed V. Three acceleration states may be distinguished, viz. no acceleration, immediately after start of acceleration, and during acceleration.

Figure 14:
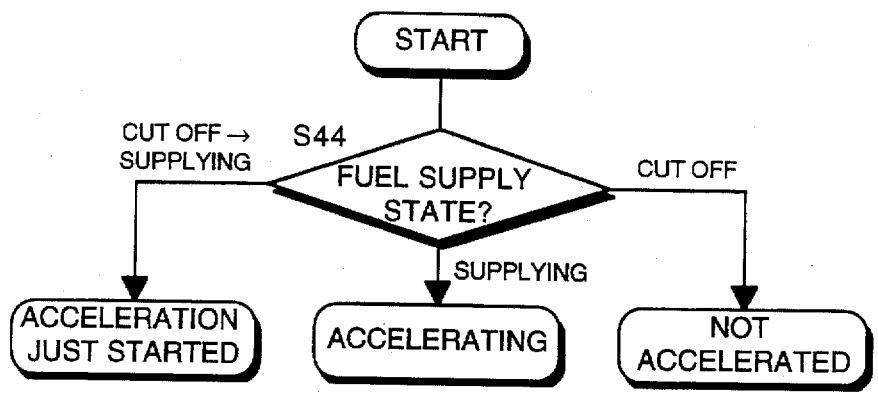
FIG. 14 is a flowchart showing an acceleration determining process according to this invention.

This acceleration determining process determines, based on the fuel injection signal output from the microprocessor 2 to the injector 4, whether the fuel supply has been cut off, is being supplied or whether fuel has just begun to be supplied after cut off as shown in step S44 of FIG. 14.

Figure 15:
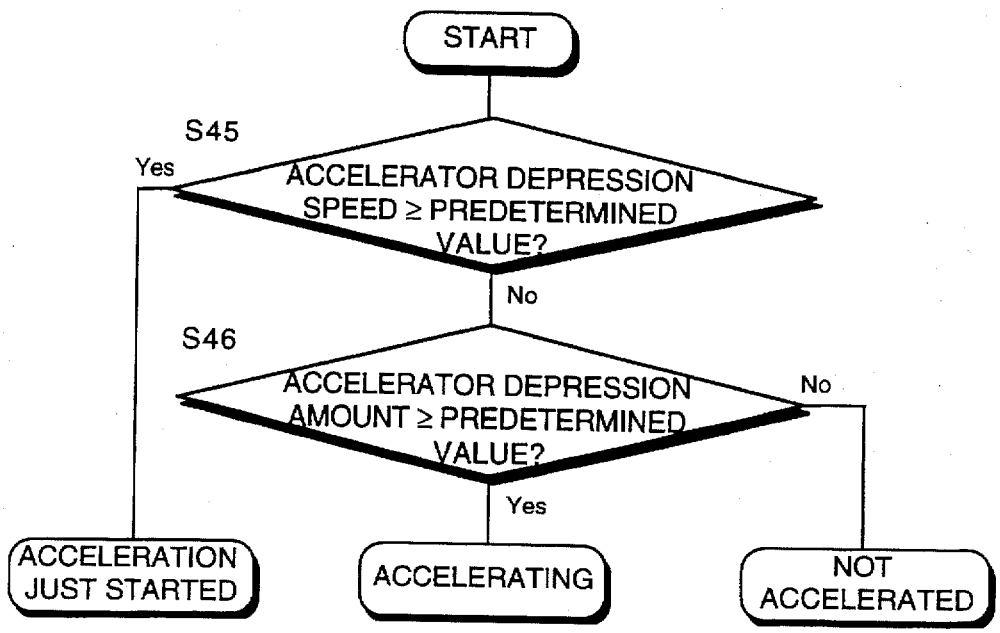
FIG. 15 is a flowchart showing an alternative process related to acceleration determination according to this invention.

FIG. 15 shows an alternative process related to acceleration determination. In FIG. 15, acceleration determination is performed using accelerator depression speed and amount. First, in a step S45, when the accelerator depression speed is equal to or exceeds a predetermined value, it is determined that acceleration has begun. If it is less than the predetermined value, the accelerator depression amount is compared with a predetermined value in a step S46. If the amount is equal to or exceeds the predetermined value, it is determined that the vehicle is accelerating, whereas if it is less than the predetermined value, it is determined that the vehicle is not accelerating.

Returning to the routine of FIG. 3, when the vehicle is not accelerating, the control timer value CNTRET which is a parameter for controlling ignition timing retardation angle, the ignition timing correction amount LURTS and retardation angle counter value CNTREF are cleared in a step S24, and the routine is terminated.

When it is determined in the step S23 that the vehicle has just started accelerating, a predetermined value TMRRTRD is stored in the control timer value CNTRET in a step S25, and the routine is terminated. The control timer value CNTRET is a timer value which decreases at a certain rate from the predetermined value TMRRTD, and when it is 0, the control period of ignition timing has terminated. Hence, the predetermined value TMRRTD signifies the length of the control period.

When it is determined in the step S23 that the vehicle is accelerating, it is determined in a step S26 whether or not the vehicle is in the control period, i.e. whether or not the control timer value CNTRET is 0. If the control timer value CNTRET is 0, the vehicle is not within the control period, so the aforesaid process in the step S24 is performed and the routine is terminated.

If the control timer value CNTRET is not 0 in the step S26, the vehicle is within the ignition period control period. In this case, it is determined in a step S27 whether or not the vehicle is in a retardation angle correction period, i.e. whether or not the retardation angle counter value CNTREF is 0. If the retardation angle counter value CNTREF is not 0, it is determined that the vehicle is in the retardation angle correction period, then in a step S28, a preset angle LURTM is set by the retardation angle correction amount LURTS and the routine is terminated.

Figure 9A:
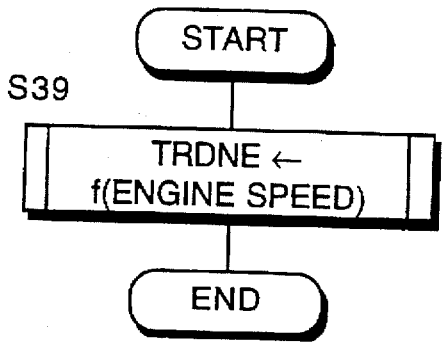
Figure 9B:
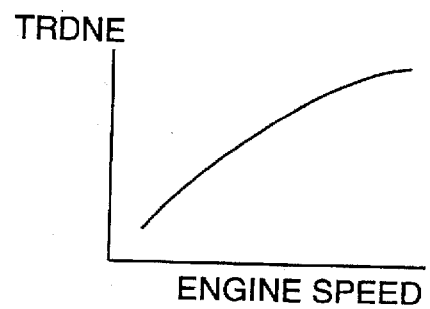

If in the step S27, the retardation angle counter value is 0, in a step S29, a positive variation rate DELTNE of the engine speed Ne is compared with a predetermined value TRDNE. This predetermined value TRDNE is given according to the engine speed Ne as shown by the graph of FIG. 9B and a step S39 of FIG. 9A. If the variation rate DELTNE does not exceed the predetermined value TRDNE, the retardation angle correction value LURTS is cleared in a step S30 and the routine is terminated.

If the positive variation rate DELTNE of the engine speed Ne exceeds the predetermined value TRDNE in the step S29, the retardation angle correction conditions hold, so the control timer value CNTRET is reduced in a step S31. After this reduction, it is determined in a step S32 whether or not the control timer value CNTRET is 0. If the value CNTRET is 0, the vehicle is determined to be outside the control period, the aforesaid process of the step S24 is performed, and the routine is terminated.

Figure 4A:
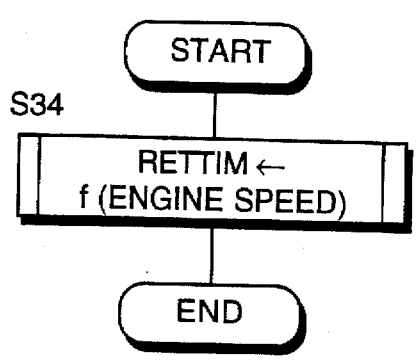
FIGS. 4A–8B are combinations of flowcharts and graphs related to a determining process of a predetermined value RETTIM according to this invention.
Figure 4B:
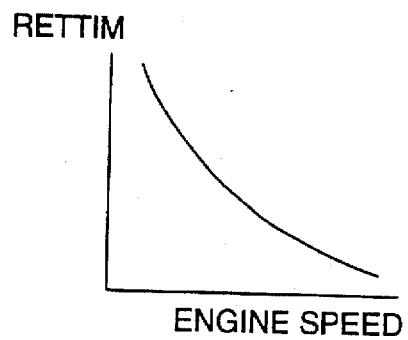

If in the step S32, the value CNTRET is not 0 after reduction, it is determined that the control period is still continuing, and in a step S33, the predetermined value RETTIM is stored as an initial value of the retardation angle counter value CNTREF. This predetermined value RETTIM is given according to the engine speed Ne as shown by the graph of FIG. 4B and a step S34 in FIG. 4A. Subsequently, in a step S28, the preset angle LURTM is set to the retardation angle correction amount LURTS, and the routine is terminated.

Figure 16:
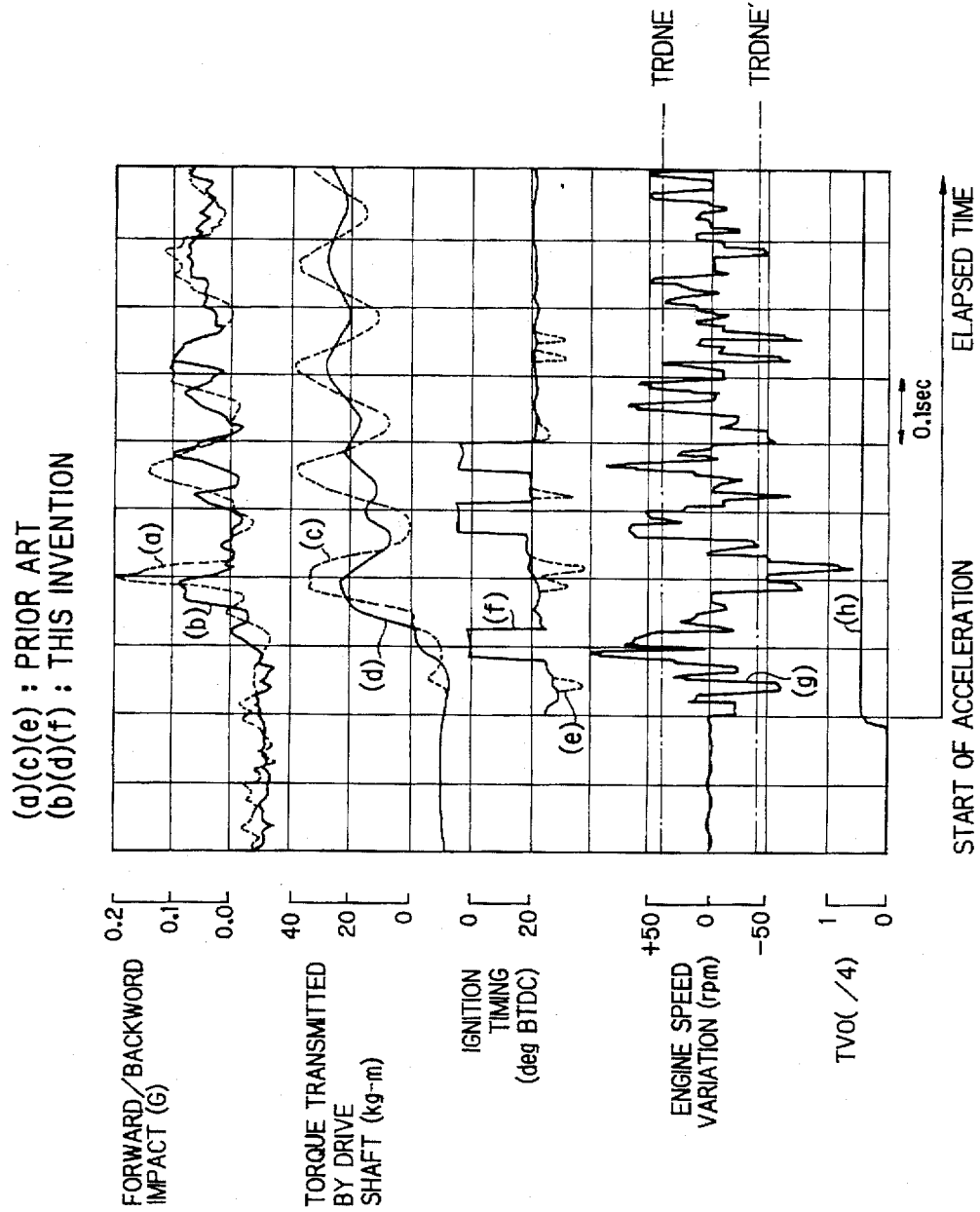
FIG. 16 is a diagram showing an oscillation suppressing effect according to this invention.

FIG. 16 compares the ignition timing control according to the aforesaid process, and the relation between the torque transmitted by the drive shaft of the vehicle and forward/backward oscillation of the vehicle, with the aforesaid prior art. In the prior art, the ignition period is corrected when the absolute value of the engine speed variation rate, exceeds the predetermined value TRDNE as can be seen from FIG. 16(g). As seen in FIG. 16(e), when the engine speed variation exceeds a negative value TRDNE, the ignition timing is advanced, whereas when it exceeds a positive value TRDNE, the rate is retarded. When this cycle is repeated, there is a large torque vibration of the drive shaft, especially in the initial stage of acceleration as shown by the curve (C) in the figure, and the forward/backward impact acting on the vehicle also varies with a large amplitude as shown by the curve (a) in the figure.

According to this controller, however, the ignition timing is corrected only when the positive variation rate DELTNE of the engine speed exceeds the predetermined value TRDNE, hence the vibration of the drive shaft does not become too large as shown by the curve (b) and the oscillation of the vehicle in the forward/backward direction is correspondingly less.

The predetermined value RETTIM which is the initial value of the retardation angle count value CNTREF and the predetermined value TRDNE which serves as a comparison reference for the positive variation rate DELTNE of the engine speed, do not necessarily depend on the engine speed Ne, but can be set according to a variety of different parameters as expressed below.

Figure 6A:
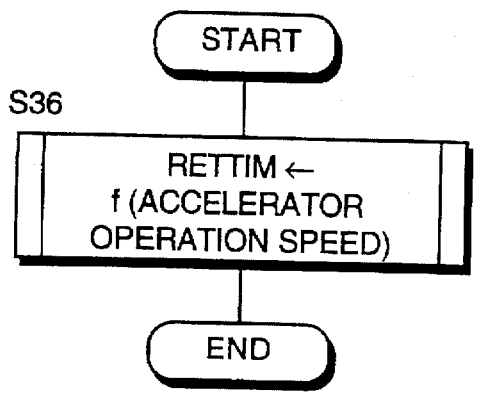
Figure 6B:
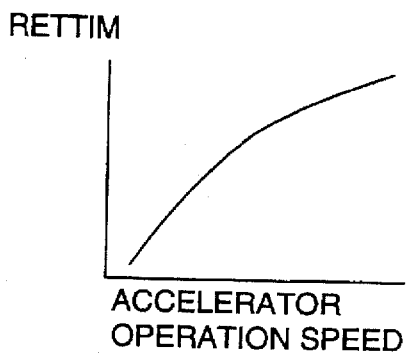

The predetermined value RETTIM can be set according to the accelerator depression amount as shown by the step S36 in FIG. 6A and FIG. 6B.

Figure 5A:
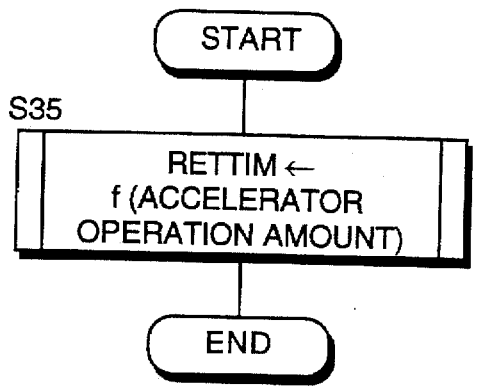
Figure 5B:
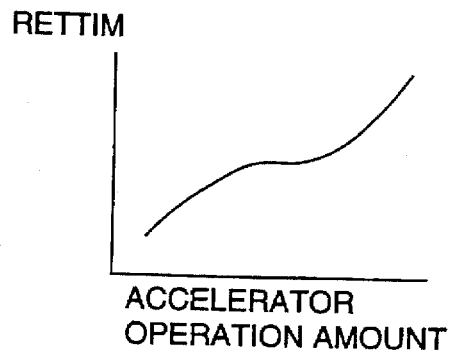

Alternatively, the predetermined value RETTIM can be set according to the accelerator depression speed as shown by the step S35 in FIG. 5A and FIG. 5B.

Figure 7A:
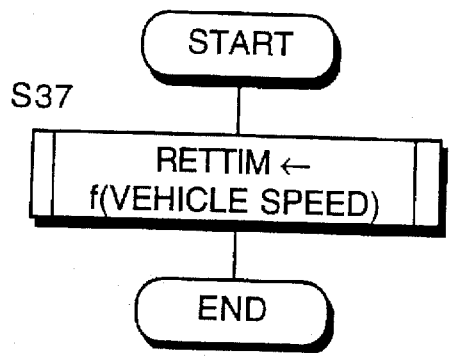
Figure 7B:
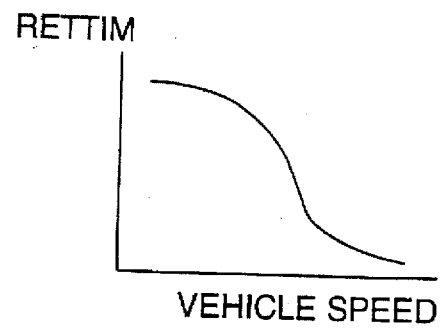

Alternatively, the predetermined value RETTIM can be set according to the vehicle speed (V) as shown by the step S37 in FIG. 7A and FIG. 7B.

Figure 8A:
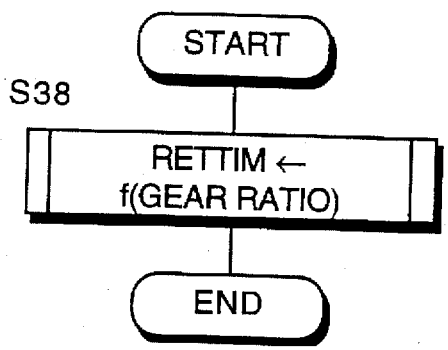
Figure 8B:
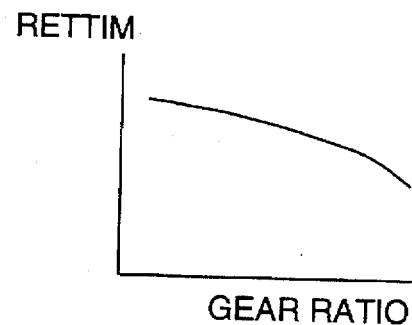

Alternatively, the predetermined value RETTIM can be set according to the gear ratio of the gears as shown by the step S38 in FIG. 8A and FIG. 8B.

Likewise, the predetermined value TRDNE can be set according to the accelerator depression amount as shown by the step S40 in FIG. 10A and FIG. 10B.

Alternatively, the predetermined value TRDNE can be set according to the accelerator depression speed as shown by the step S41 in FIG. 11A and FIG. 11B.

Alternatively, the predetermined value TRDNE can be set according to the vehicle speed (V) as shown by the step S42 in FIG. 12A and FIG. 12B.

Figures 13A, 13B:
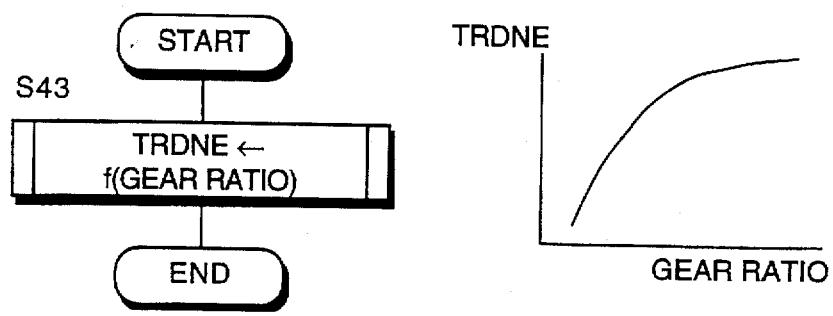

Alternatively, the predetermined value TRDNE can be set according to the gear change ratio of the gears as shown by the step S43 in FIG. 13A and FIG. 13B.

The embodiments of this invention in which an exclusive property or privilege is claimed are defined as follows:

1. An ignition timing controller for use with an internal combustion engine of a vehicle provided with a mechanism for igniting fuel, said controller comprising:

means for detecting a running condition of said engine, means for determining an optimum ignition period based on said running condition, means for determining whether or not the vehicle is accelerating, means for detecting a rotation variation of said engine, means for retarding said ignition period by a predetermined correction amount when said rotation variation is a positive value greater than a predetermined reference value while the vehicle is accelerating, and means for setting said correction amount to zero when said rotation variation is less than or equal said predetermined reference value, means for detecting an operation speed of an accelerator of said vehicle, and means for increasing or decreasing said predetermined reference value based on said operation speed.

2. An ignition timing controller as defined in claim 1, wherein said controller further comprises means for detecting a rotation speed of said engine, means for setting a retardation period based on said engine speed and means for setting said correction amount to zero after said retardation period has elapsed.

3. An ignition timing controller as defined in claim 1, wherein said controller further comprises means for detecting an operation amount of an accelerator of said vehicle, means for setting a retardation period based on said operation amount and means for setting said correction amount to zero after said retardation period has elapsed.

4. An ignition timing controller as defined in claim 1, wherein said controller further comprises means for setting said retardation period based on said operation speed and means for setting said correction amount to zero after said retardation period has elapsed.

5. An ignition timing controller as defined in claim 1, wherein said controller further comprises means for detecting a travel speed of said vehicle, means for setting a retardation period based on said travel speed and means for setting said correction amount to zero after said retardation period has elapsed.

6. An ignition timing controller as defined in claim 1, wherein said controller further comprises means for detecting a gear ratio of an applied gear of said vehicle, means for setting a retardation period based on said gear ratio and means for setting said correction amount to zero after said retardation period has elapsed.

7. An ignition timing controller as defined in claim 1, wherein said acceleration determining means comprises means for determining whether or not fuel is being supplied to said engine and means for determining that the vehicle is accelerating when fuel is supplied after the state when fuel is not supplied.

8. An ignition timing controller as defined in claim 1, wherein said controller further comprises means for detecting an operation amount of an accelerator of said vehicle and said acceleration determining means determines that said vehicle is accelerating when said operation amount and said operation speed both are not less than predetermined values.

* * * * *